US008838766B2

(12) United States Patent
Jeon et al.

(10) Patent No.: US 8,838,766 B2
(45) Date of Patent: Sep. 16, 2014

(54) MODULE AND METHOD FOR SEMANTIC NEGOTIATION (75) Inventors: Paul Barom Jeon, Seoul (KR); Doo Kwon Baik, Seoul (KR); Jang Won Kim, Seoul (KR); Suk Hoon Lee, Seoul (KR); Chong Hyun Lee, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 184 days.

(21) Appl. No.: 13/323,342

(22) Filed: Dec. 12, 2011

(65) Prior Publication Data

US 2012/0209973 A1 Aug. 16, 2012

(30) Foreign Application Priority Data

Feb. 10, 2011 (KR) ........................ 10-2011-0011950

(51) Int. Cl.
G06F 15/173 (2006.01)
(52) U.S. Cl.
USPC ........................................................ 709/223
(58) Field of Classification Search
USPC ................................................. 709/223, 224
See application file for complete search history.

(56) References Cited

U.S. PATENT DOCUMENTS

| | | | | |
|---|---|---|---|---|
| 8,639,245 B2 * | 1/2014 | Shi et al. ..................... | 455/435.2 |
| 2002/0176404 A1 * | 11/2002 | Girard ........................... | 370/352 |
| 2003/0084300 A1 * | 5/2003 | Koike ............................ | 713/182 |
| 2003/0144975 A1 * | 7/2003 | Kawamura et al. ............. | 706/45 |
| 2004/0107155 A1 * | 6/2004 | Yanosy ............................ | 705/37 |
| 2005/0108036 A1 * | 5/2005 | Andreoli et al. .................. | 705/1 |
| 2006/0072573 A1 * | 4/2006 | Broberg et al. ................ | 370/392 |
| 2006/0190605 A1 * | 8/2006 | Franz et al. .................... | 709/226 |
| 2007/0064715 A1 * | 3/2007 | Lloyd et al. ................... | 370/401 |
| 2007/0099647 A1 * | 5/2007 | Lee et al. ....................... | 455/522 |
| 2007/0237078 A1 * | 10/2007 | Hundscheidt et al. ........ | 370/235 |
| 2008/0271058 A1 | 10/2008 | Sathish | |
| 2009/0300002 A1 * | 12/2009 | Thomas et al. ................... | 707/5 |
| 2010/0057485 A1 * | 3/2010 | Luft .................................. | 705/1 |
| 2010/0131928 A1 * | 5/2010 | Parthasarathy et al. ....... | 717/126 |
| 2010/0217855 A1 * | 8/2010 | Przybysz et al. .............. | 709/223 |
| 2012/0089664 A1 * | 4/2012 | Igelka ............................ | 709/203 |
| 2012/0209934 A1 * | 8/2012 | Smedman ..................... | 709/208 |

FOREIGN PATENT DOCUMENTS

| | | | |
|---|---|---|---|
| CN | 1648859 A * | 8/2005 | |
| JP | 10-126852 | 5/1998 | |
| JP | 10-177468 | 6/1998 | |
| KR | 10-2006-0065968 | 6/2006 | |
| KR | 10-0751292 | 8/2007 | |
| KR | 10-2010-0068159 | 6/2010 | |
| WO | WO 2010097118 A1 * | 9/2010 | |

\* cited by examiner

*Primary Examiner* — Kostas Katsikis
(74) *Attorney, Agent, or Firm* — NSIP Law (57) ABSTRACT In various aspects, it is possible to provide an optimized service to a mobile terminal and a user, without prior knowledge of a service that the user prefers to use, or without a client module of a tightly coupled configuration. The optimized service may be provided by performing a semantic negotiation based on one or more ontologies. Also, it is possible to improve user convenience by automatically performing the semantic negotiation between the mobile terminal and a service server without user intervention.

19 Claims, 9 Drawing Sheets

MODULE AND METHOD FOR SEMANTIC NEGOTIATION

CROSS-REFERENCE TO RELATED APPLICATION(S)

This application claims the benefit under 35 U.S.C. §119 (a) of Korean Patent Application No. 10-2011-0011950, filed on Feb. 10, 2011, in the Korean Intellectual Property Office, the entire disclosure of which is incorporated herein by reference for all purposes.

BACKGROUND

1. Field

The following description relates to a semantic negotiation method, and more particularly, to a semantic negotiation method based on ontology.

2. Description of Related Art

Generally, a conventional semantic processing system may have a three-tier configuration that includes a server module to provide a service, a client module including information about a user, and an agent module to provide a service based on a demand of the user using information of the service provided by the server module, and the information provided by the client module. The three-tier configuration may require the agent module in addition to a service provider and a service consumer. Accordingly, the service consumer, for example, the client module may need to know an address of a predetermined agent module in order to use the service, and the service provided by the service provider. For example, the server module may need to be registered with the agent module.

Figure 1:
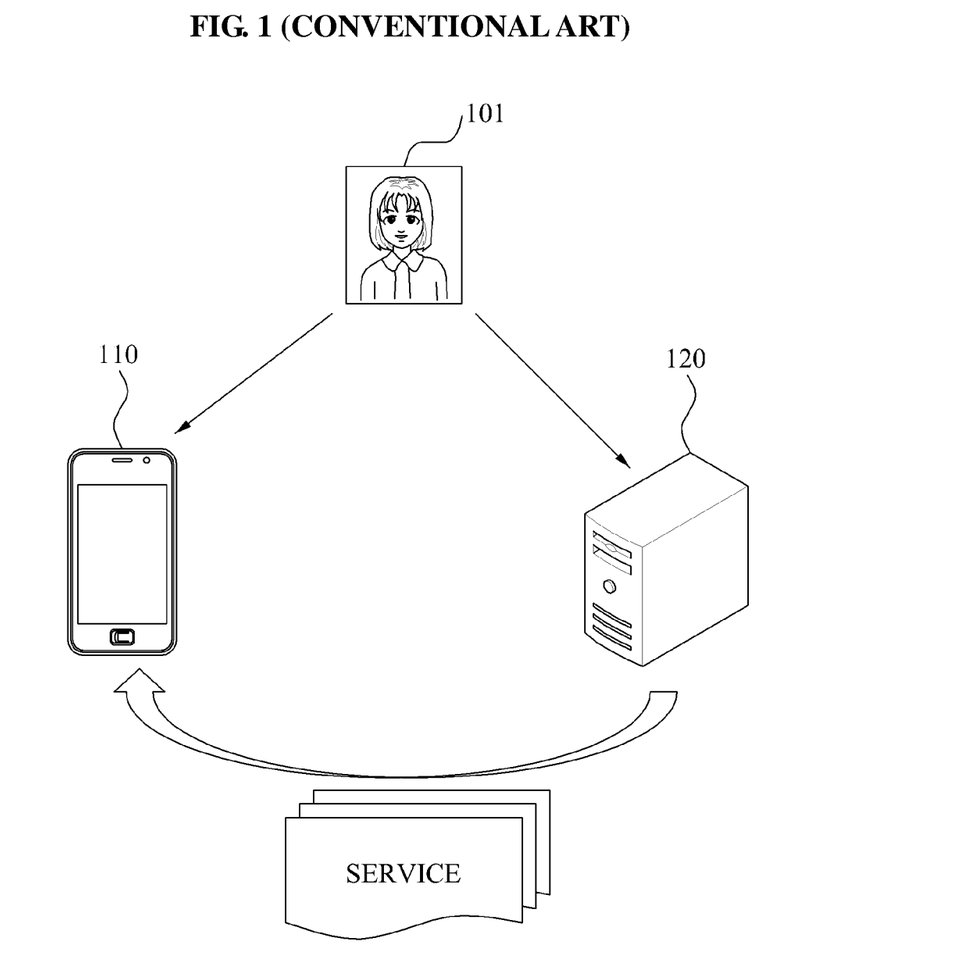
FIG. 1 is a diagram illustrating an example of a conventional method of using a mobile service.

FIG. 1 illustrates a conventional method of using a mobile service.

Referring to FIG. 1, in a conventional method of using the mobile service, both a server module 120 of a server that may provide a service, and a client module 110 of a mobile device may be designed by the same service provider 101.

Thus, the interaction between the client module 110 and the server module 120 may be formed of a tightly coupled configuration. For example, only an interaction that is pre-defined may be performed between the client module 110 and the server module 120. In this conventional method, flexibility of interaction flow between the client module 110 and the server module 120 is limited.

Also, an input-output correspondence configuration of the interaction may always be constant. In this conventional method, interaction may be performed by a predefined input only. Accordingly, the conventional method for using the mobile service may enable use of the mobile service only when the client module 110 corresponding to the mobile service is provided.

SUMMARY

In one general aspect, there is provided a semantic negotiation module of a terminal, the semantic negotiation module including a communication manager to transmit, to a service server, a service request message requesting an optimized service, and to receive, from the service server, a constraint query message with respect to a constraint for performing the optimized service, and a semantic negotiator to extract a value of the constraint, based on at least one of user ontology and terminal ontology, wherein the communication manager transmits, to the service server, the value of the extracted constraint, and receives, from the service server, information about the optimized service.

The communication manager may receive, from the service server, a preference query message with respect to a user preference, the semantic negotiator may extract a value of the user preference, based on the at least one of the user ontology and the terminal ontology, and the communication manager may transmit, to the service server, the extracted value of the user preference, and receive, from the service server, information with respect to the optimized service to which the value of the user preference is applied.

In another aspect, there is provided a semantic negotiation module of a server, the semantic negotiation module including a communication manager to receive, from a terminal, a service request message requesting an optimized service, to transmit, to the terminal, a constraint query message with respect to a constraint for performing the optimized service, and to receive, from the terminal, a value of the constraint, and a semantic negotiator to perform constraint matching to search for a service that satisfies the constraint, from among a plurality of services, based on the value of the constraint and a service ontology, and to determine a service to be the optimized service based on the constraint matching, wherein the communication manager transmits, to the terminal, information with respect to the optimized service.

The communication manager may transmit, to the terminal, a preference query message with respect to a user preference, and receive, from the terminal, a value of the user preference, and the semantic negotiator may calculate a score with respect to the service searched by the constraint matching, based on the value of the user preference, and determine the optimized service based on the calculated score.

The semantic negotiator may initialize the score of the service searched by the constraint matching, the semantic negotiator may increase the score of an item that has a service preference property that matches the value of the user preference, from among a plurality of items with respect the user preference, and the semantic negotiator may decrease the score of an item that has a service preference property that does not match the value of the user preference.

The semantic negotiator may compare a plurality of items of the constraint, search for a service that satisfies all of the plurality of items, and determine a service that satisfies all of the plurality of items to be the optimized service.

In another aspect, there is provided a semantic negotiation method of a terminal, the method including transmitting, to a service server, a service request message requesting an optimized service, receiving, from the service server, a constraint query message with respect to a constraint for performing the optimized service, extracting a value of the constraint, based on at least one of user ontology and terminal ontology, transmitting, to the service server, the value of the extracted constraint, and receiving, from the service server, information with respect to the optimized service.

The semantic negotiation method may further comprise receiving, from the service server, a preference query message with respect to a user preference, extracting a value of the user preference, based on the at least one of the user ontology and the terminal ontology, transmitting, to the service server, the extracted value of the user preference, and receiving, from the service server, information with respect to the optimized service to which the value of the user preference is applied.

In another aspect, there is provided a semantic negotiation method of a server, the method including receiving, from a terminal, a service request message requesting an optimized service, transmitting, to the terminal, a constraint query message with respect to a constraint for performing the optimized service, receiving, from the terminal, a value of the constraint, performing constraint matching to search for a service that satisfies the constraint, from among a plurality of services, based on the value of the constraint and a service ontology, determining a service to be the optimized service based on the constraint matching, and transmitting, to the terminal, information with respect to the optimized service.

The semantic negotiation method may further comprise transmitting, to the terminal, a preference query message with respect to a user preference, receiving, from the terminal, a value of the user preference, calculating a score with respect to the service searched by the constraint matching, based on the value of the user preference, and determining the optimized service based on the calculated score.

In another aspect, there is provided a computer-readable storage medium having stored therein program instructions to cause a processor to implement a semantic negotiation method of a terminal, the semantic negotiation method including transmitting, to a service server, a service request message requesting an optimized service, receiving, from the service server, a constraint query message with respect to a constraint for performing the optimized service, extracting a value of the constraint, based on at least one of user ontology and terminal ontology, transmitting, to the service server, the value of the extracted constraint, and receiving, from the service server, information with respect to the optimized service.

In another aspect, there is provided a terminal to be loosely coupled to a server to perform semantic negotiation based on an ontology, the terminal including a communication manager configured to receive a constraint query message identifying a constraint of a service of the server, and a semantic negotiator to extract the constraint from at least one ontology corresponding to a user of the terminal and/or the terminal, wherein the communication manager is further configured to transmit the extracted constraint to the server.

The semantic negotiator may be configured to convert semantic contents included in the constraint query message into the form of a SPARQL query, and configured to process the SPARQL query based on the at least one ontology and an inference engine, to extract the constraint.

Prior to receiving the constraint query message from the server, the communication manager may be further configured to transmit a request requesting an optimized service to the server.

The communication manager may be further configured to receive a preference query message from the server which requests a preference of the user based on a service ontology, the semantic negotiator may extract the user preference based on the at least one ontology, and the communication manager may transmit the extracted user preference to the server.

The communication manager may be further configured to receive information about an optimized service from the server, and the optimized service may be determined by the server based constraint matching of the extracted user preference of the terminal.

In response to receiving the preference query from the server, the semantic negotiator may be further configured to extract a plurality of items corresponding to the constraint based on the at least one ontology, and the communication manager may be further configured to transmit the plurality of items corresponding to the constraint to the server.

The at least one ontology may comprise a terminal ontology that includes a hardware platform identifying hardware values of the terminal and a software platform identifying software values of the terminal, and a user ontology that includes user preferences of the user of the terminal.

The communication manager may be further configured to transmit and receive messages for semantic negotiation with the server using an agent communication language (ACL) as stated in the Foundation for Intelligent Physical Agents (FIPA) standards.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

The following description provides a semantic negotiation method that has a two-tier configuration that provides a service without the need for a separate agent module.

Figure 2:
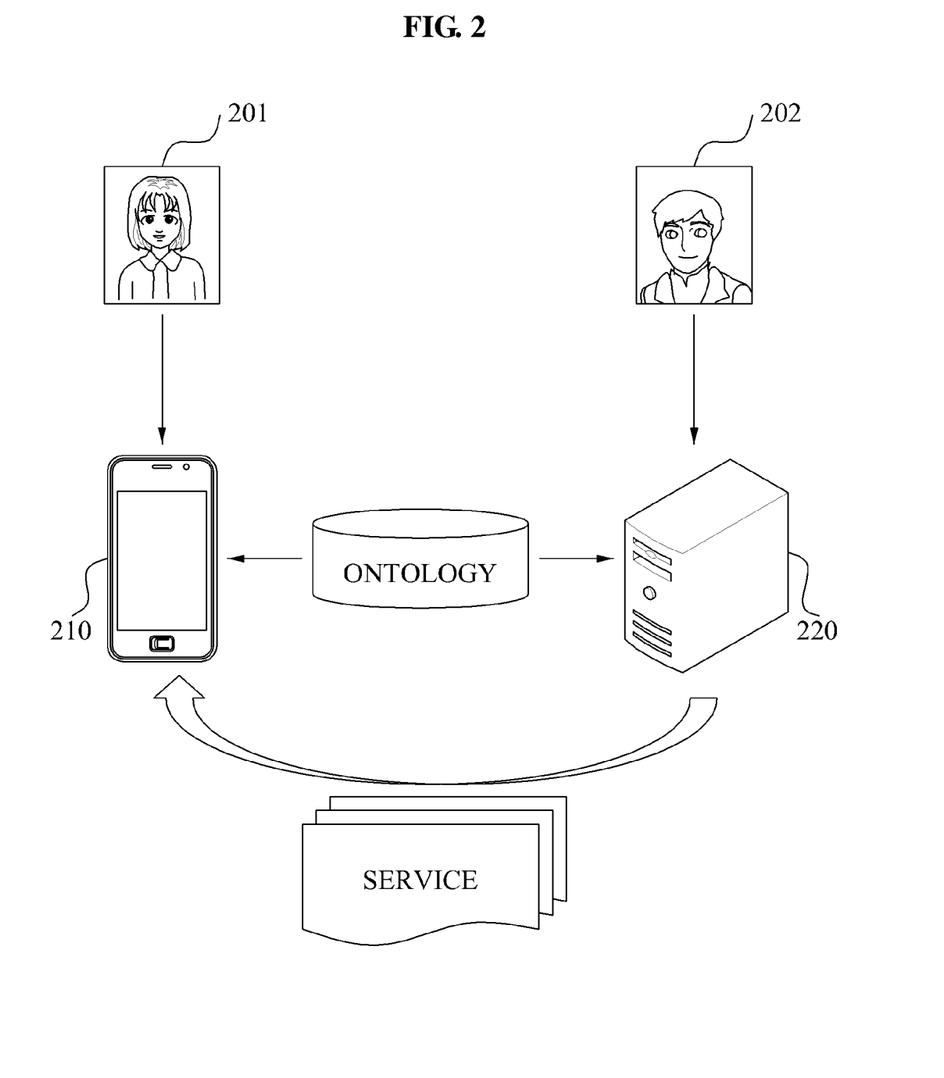
FIG. 2 is a diagram illustrating an example of using a mobile service through a semantic negotiation based on an ontology.

FIG. 2 illustrates an example of using a mobile service through a semantic negotiation based on an ontology.

Referring to FIG. 2, a client module 210 may be designed by a first service provider 201 and a server module 220 may be designed by a second service provider 202. That is, each of the client module 210 and the server module 220 may be designed by different service providers such as the first service provider 201 and the second service provider 202.

The first service provider 201 may not know various properties of the server module 220, and the second service provider 202 may not know various properties of the client module 210. Accordingly, interaction between the client module 210 and the server module 220 may be formed of a loosely coupled configuration. As an example, knowledge of a domain in which the interaction between the client module 210 and the server module 220 is performed may be described using an ontology. Also, the knowledge of the domain may be expressed at a level at which a mobile terminal including the client module 210, and a service server including the server module 220 may interact with each other.

Accordingly, if the service providers for the client module 210 and the server module 220 are different, the method of using the mobile service may perform the interaction by sharing the ontology. Also, the method of using the mobile service may reduce intervention of a user through a semantic negotiation that is based on the ontology, and may perform optimization of the service by sharing information between the mobile terminal including the client module 210, and the service server including the server module 220.

Figure 3:
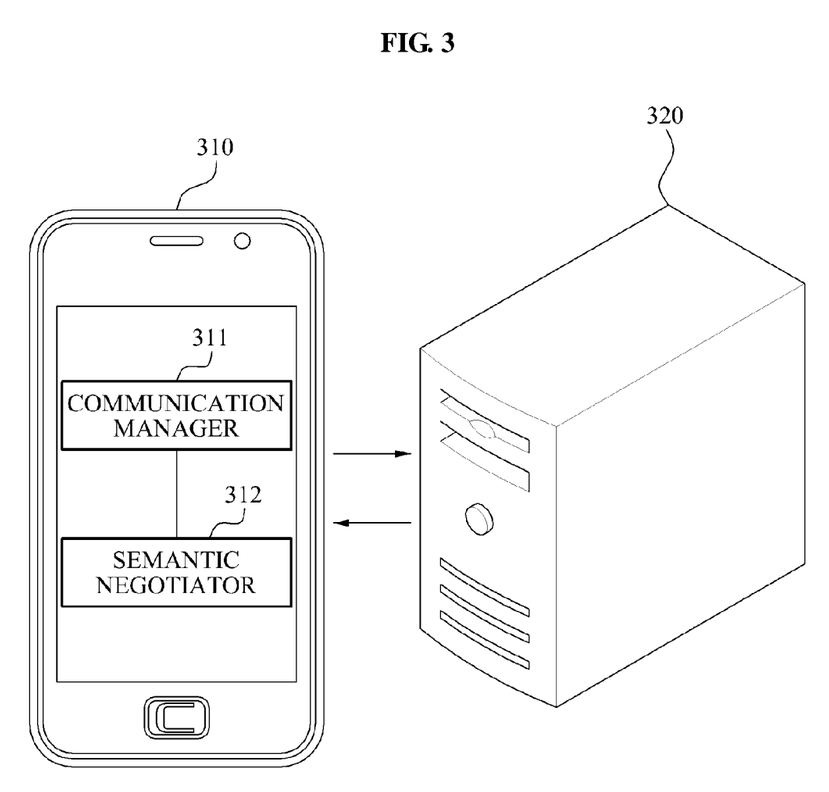
FIG. 3 is a diagram illustrating an example of a semantic negotiation module.

FIG. 3 illustrates an example of a semantic negotiation module.

Referring to FIG. 3, the semantic negotiation module includes a communication manager 311 and a semantic negotiator 312.

The semantic negotiation module may be incorporated into each of a terminal 310 and a service server 320, and may be in the form of a single module. Accordingly, the method of using the mobile service and using the semantic negotiation module may have a two-tier configuration.

An operation of the semantic negotiation module included in the terminal 310 is hereinafter described with reference to FIG. 3.

The communication manager 311 may transmit, to the service server 320, a service request message that requests a service such as an optimized service.

The semantic negotiation module that is included in the service server 320, may receive the service request message from the communication manager 311. The semantic negotiation module that is included in the service server 320 may transmit, to the terminal 310, a constraint query message about a constraint for performing the optimized service.

For example, the semantic negotiation module that is included in the service server 320 may extract the constraint for performing a service, from a service ontology, by loading the service ontology to a memory. The semantic negotiation module that is included in the service server 320 may transmit, to the terminal 310, the constraint query message about the extracted constraint.

As an example, the constraint may include at least one of a constraint with respect to the terminal 310 and a constraint with respect to a user. For example, if a screen size greater than 800×480 is required to perform a predetermined service, the screen size greater than 800×480' may be a constraint for performing an optimized service. The constraint for performing a service may be described in the service ontology. An example of a service ontology is further described with reference to FIG. 8.

The semantic negotiation module that is included in the service server 320 may perform an authentication procedure to verify an identification of the terminal 310 before transmitting the constraint query message to the terminal 310. In this example, if the identification of the terminal 310 is verified, the semantic negotiation module that is included in the service server 320 may transmit the constraint query message to the terminal 310.

The communication manager 311 may receive the constraint query message about the constraint for performing the optimized service, from the service server 320. For example, the communication manager 311 may transmit and receive messages using an agent communication language (ACL) stated in the Foundation for Intelligent Physical Agents (FIPA) standards.

The semantic negotiator 312 may perform a semantic negotiation based on ontology between the terminal 310 and the service server 320. For example, the semantic negotiator 312 may convert semantic contents that are included in a message received from the service server 320, into a form of a SPARQL query. The semantic negotiator 312 may process the SPARQL query using domain ontology and an inference engine. As an example, the semantic negotiator 312 may perform query processing of information corresponding to at least one of a property of a mobile terminal and a user preference. The semantic negotiator 312 may generate semantic contents using an inference result.

The semantic negotiator 312 may perform a semantic negotiation by interworking with a semantic web framework, for example, Jena Semantic Web Framework. The semantic negotiator 312 may extract a value of the constraint for performing the optimized service, based on at least one of user ontology or terminal ontology. Examples of the user ontology and the terminal ontology are further described with reference to FIGS. 6 and 7.

The communication manager 311 may transmit the value of the extracted constraint to the service server 320. For example, the communication manager 311 may transmit the value of the extracted constraint by preparing the value in a form of a resource description framework (RDF).

In this example, the semantic negotiation module included in the service server 320 may receive, from the communication manager 311, the value of the constraint.

The semantic negotiation module that is included in the service server 320 may perform constraint matching to search for a service that satisfies the constraint from among a plurality of services, based on the value of the constraint and the service ontology.

The semantic negotiation module included in the service server 320 may determine a service that matches the constraint to be the optimized service.

The semantic negotiation module that is included in the service server 320, may compare a plurality of items of the constraint, and the value of the constraint, and may search whether there is a service that satisfies all of the plurality of the items.

The semantic negotiation module that is included in the service server 320 may compare the plurality of the items of the constraint for performing the service, and a constraint value of the terminal 310 or the user. For example, the semantic negotiation module that is included in the service server 320 may search whether there is the constraint value of the terminal 310 or the user that satisfies the constraint, by performing a comparison operation.

For example, if a constraint of a 'screen size' item, from among a plurality of items of the constraint for performing the service, corresponds to 'a screen size greater than 800×480', the semantic negotiation module that is included in the service server 320, may determine whether the service is capable of being performed in the terminal 310, by searching a value of the screen size of the terminal 310. For example, if the screen size of the terminal 310 is greater than 800×480, the service may not be capable of being performed, however, if the screen size of the terminal 310 is less than 800×480, the service may be capable of being performed.

If there is a service that satisfies all of the plurality of the items, the semantic negotiation module that is included in the service server 320, may determine the service to be an optimized service. In this example, a service that fails to satisfy one or more of the plurality of items may not be determined to be the optimized service.

The semantic negotiation module that is included in the service server 320 may transmit, to the terminal 310, information with respect to the optimized service.

The communication manager 311 may receive the information with respect to the optimized service, from the service server 320.

For example, the semantic negotiation module may perform a semantic negotiation based on a user preference. The semantic negotiation module may further perform the semantic negotiation based on the user preference to search for a service corresponding to the user preference from among services searched by performing constraint matching.

As an example, if supported languages for displaying a menu of a service are Korean and English, there may be a person that prefers Korean, a person that prefers English, and a person that does not have a preferred language, based on a preference. Accordingly, the semantic negotiation module may perform the semantic negotiation based on the user preference, for example, a service supported language. The user preference may be described in a service ontology.

The semantic negotiation module that is included in the service server 320 may transmit, to the terminal 310, a preference query message with respect to the user preference. The semantic negotiation module that is included in the service server 320 may extract the user preference from the service ontology by loading the service ontology to a memory, and may transmit the preference query message with respect to the extracted user preference, to the terminal 310.

The communication manager 311 may receive the preference query message from the service server 320. The semantic negotiator 312 may extract a value of the user preference, based on at least one of the user ontology and the terminal ontology. The communication manager 311 may transmit the value of the user preference, to the service server 320. For example, the communication manager 311 may transmit the value of the user preference by preparing the value in a form of RDF.

In this example, the semantic negotiation module included in the service server 320 may receive, from the terminal 310, the value of the user preference.

The semantic negotiation module, included in the service server 320, may calculate a score of the service searched by the constraint matching, based on the value of the user preference. The semantic negotiation module included in the service server 320 may calculate the score of the service searched by the constraint matching for each of a plurality of items of the user preference.

The semantic negotiation module that is included in the service server 320, may repeatedly calculate scores of the plurality of items of the user preference, and may calculate the sum of the calculated scores. The semantic negotiation module that is included in the service server 320 may determine an optimized service based on the calculated scores. For example, a service that obtains the highest score may be determined as the optimized service.

The semantic negotiation module that is included in the service server 320 may initialize the score of each service searched by the constraint matching. The semantic negotiation module included in the service server 320 may increase the score, for example, by 10, of an item that has a service preference property that is the same as the value of the user preference, from among the plurality of items of the user preference. The semantic negotiation module included in the service server 320 may decrease the score, for example, by 10, of an item that does not have a service preference property that is the same as the user preference. As another example, if there is no item that has the same service preference property as the user preference, the semantic negotiation module that is included in the service server 320 may maintain the score of each of the plurality of the items of the user preference.

Figure 4:
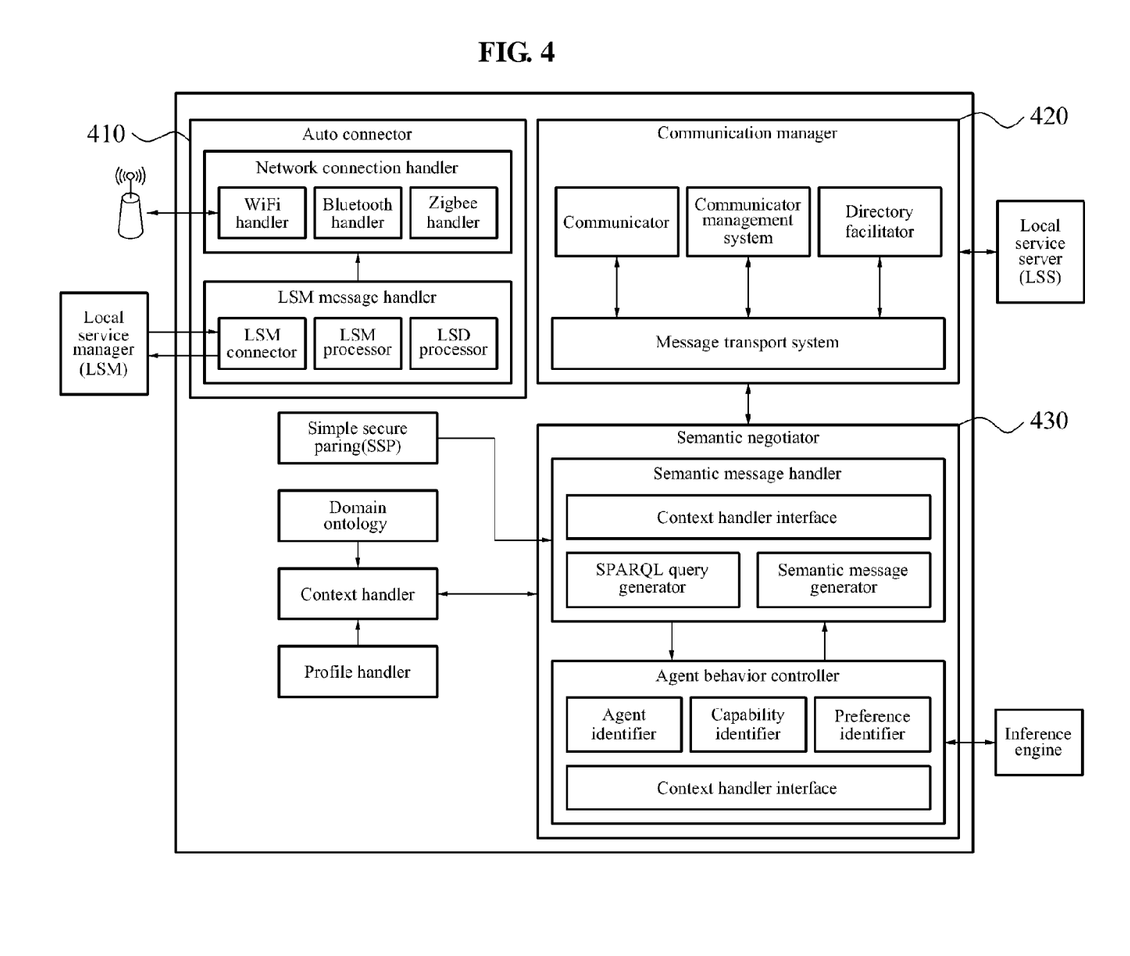
FIG. 4 is a diagram illustrating an example of a semantic negotiation module included in a terminal.

FIG. 4 illustrates an example of a semantic negotiation module included in a terminal.

Referring to FIG. 4, the semantic negotiation module included in the terminal includes an auto connector 410, a communication manager 420, and a semantic negotiator 430.

The auto connector 410 may automatically perform a wireless access of the terminal.

The communication manager 420 and the semantic negotiator 430 may be operated similarly to the description of FIG. 3, and thus, further additional description thereof is omitted here for conciseness.

Figure 5:
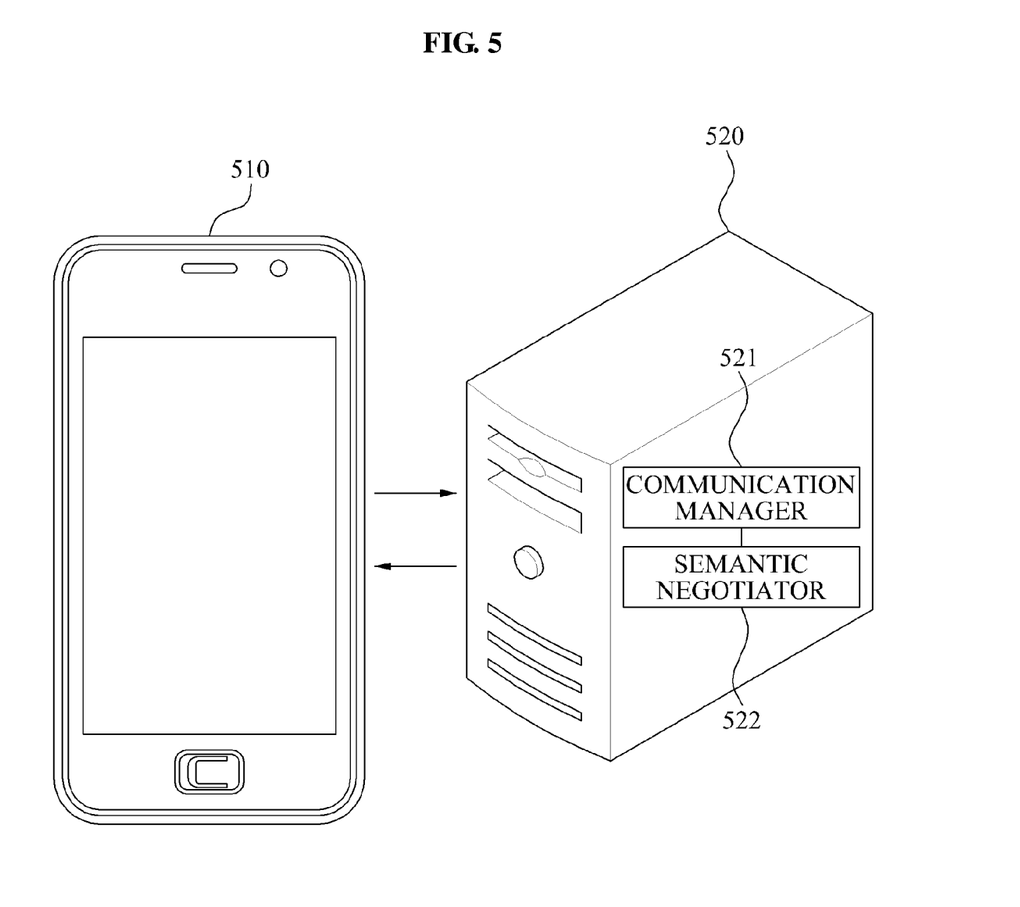
FIG. 5 is a diagram illustrating an example of a semantic negotiation module included in a service server.

FIG. 5 illustrates an example of a semantic negotiation module that is included in a service server.

Referring to FIG. 5, the semantic negotiation module that is included in service server 520 includes a communication manager 521 and a semantic negotiator 522.

For example, a semantic negotiation module may be incorporated into each of a terminal 510 and the service server 520, in the form of a single module. An operation of the semantic negotiation module that is included in the service server 520 is described with reference to FIG. 5.

The semantic negotiation module that is included in the terminal 510 may transmit a service request message for requesting an optimized service to the service server 520.

In this example, the communication manager 521 may receive the service request message from the semantic negotiation module that is included in the terminal 510. The communication manager 521 may transmit a constraint query message with respect to a constraint for performing the optimized service, to the terminal 510.

The semantic negotiation module may extract the constraint for performing a service from service ontology. The semantic negotiation module may extract the constraint by loading the service ontology to a memory, and may transmit, to the terminal 510, the constraint query message with respect to the extracted constraint.

The constraint may include at least one of a constraint of the terminal 510 and a constraint of a user. For example, if a screen size greater than 800×480 is required to perform a predetermined service, the screen size greater than 800×480' may be a constraint for performing an optimized service. The constraints for performing the service may be described in the service ontology.

The communication manager 521 may perform an authentication procedure to verify an identification of the terminal 510, before transmitting the constraint query message to the terminal 510. In response to the identification of the terminal 510 being verified, the communication manager 521 may transmit the constraint query message to the terminal 510.

The semantic negotiation module that is included in the terminal 510 may receive, from the service server 520, the constraint query message with respect to the constraint for performing the optimized service. For example, the semantic negotiation module that is included in the terminal 510 may transmit and receive a message using ACL stated in FIPA standards.

The semantic negotiation module that is included in the terminal 510 may perform a semantic negotiation based on an ontology between the terminal 510 and the service server 520. For example, the semantic negotiation module that is included in the terminal 510 may convert semantic contents that are included in a message received from the service server 520, into a form of a SPARQL query. The semantic negotiation module that is included in the terminal 510 may process the SPARQL query using a domain ontology and an inference engine. The semantic negotiation module that is included in the terminal 510 may perform query processing with respect to information corresponding to a property of a mobile terminal and/or a property of a user preference. The semantic negotiation module that is included in the terminal 510 may generate semantic contents using an inference result.

The semantic negotiation module that is included in the terminal 510 may perform a semantic negotiation by interworking with a semantic web framework, for example, Jena. The semantic negotiation module that is included in the terminal 510 may extract a value of the constraint for performing the optimized service, based on at least one of a user ontology or a terminal ontology.

The semantic negotiation module that is included in the terminal 510 may transmit, to the service server 520, the value of the extracted constraint. For example, the semantic negotiation module that is included in the terminal 510 may transmit the value of the extracted constraint by determining the value of the extracted constraint in a form of an RDF. In this example, the communication manager 521 may receive the value of the constraint from the semantic negotiation module that is included in the terminal 510.

The semantic negotiator 522 may perform constraint matching to search for a service that satisfies the constraint from among a plurality of services, based on the value of the constraint and the values included in a service ontology. The semantic negotiator 522 may determine an optimized service through constraint matching. The semantic negotiator 522 may compare a plurality of items of the constraint, and the value of the constraint, and may search for a service that satisfies all of the plurality of the items.

The semantic negotiator 522 may compare the plurality of the items of the constraint for performing the service, and a constraint value of the terminal 510 or of the user. For example, the semantic negotiator 522 may search for a constraint value of the terminal 510 or of the user that satisfies the constraint, by performing a comparison operation.

For example, if a constraint of a 'screen size' item, from among a plurality of items of the constraint for performing a service, corresponds to 'a screen size greater than 800×480', the semantic negotiator 522 may determine whether the service is capable of being performed in the terminal 510 by searching for a value of the screen size of the terminal 510. If the screen size of the terminal 510 is greater than 800×480, the service may be performed. However, if the screen size of the terminal 510 is less than 800×480, the service may not be performed.

If there is a service that satisfies all of the plurality of the items, the semantic negotiator 522 may determine the service to be the optimized service.

The communication manager 521 may transmit, to the terminal 510, information about the optimized service. The semantic negotiation module that is included in the terminal 510, may receive the information about the optimized service from the service server 520.

According to various examples, the semantic negotiation module may perform a semantic negotiation based on a user preference. The semantic negotiation module may further perform the semantic negotiation based on the user preference, in order to search for a service that corresponds to the user preference, from among services searched using constraint matching.

For example, if supported languages for displaying a menu of the service are Korean and English, there may be a person that prefers Korean, a person that prefers English, and a person that does not have a preferred language, based on a preference. Accordingly, the semantic negotiation module may perform the semantic negotiation based on the user preference, for example, a service supported language. The user preference may be described in a service ontology. Accordingly, if a user prefers English as a language for displaying a menu, the semantic negotiation may select English.

The communication manager 521 may transmit a preference query message with respect to the user preference, to the terminal 510. The semantic negotiation module that is included in the terminal 510 may extract the user preference from the service ontology by loading the service ontology to a memory, and may transmit the preference query message with respect to the extracted user preference, to the terminal 510.

The semantic negotiation module that is included in the terminal 510 may receive the preference query message from the service server 520. The semantic negotiation module that is included in the terminal 510 may extract a value of the user preference, based on at least one of the user ontology and the terminal ontology. The semantic negotiation module that is included in the terminal 510 may transmit, to the service server 520, the value of the user preference. For example, the semantic negotiation module that is included in the terminal 510 may transmit the value of the user preference by determining the value of the user preference in the form of RDF. In this example, the communication manager 521 may receive the value of the user preference, from the terminal 510.

The semantic negotiator 522 may calculate a score of the service searched by constraint matching, based on the value of the user preference. For example, the semantic negotiator 522 may calculate the score of the service searched by the constraint matching for each of a plurality of items of the user preference. The semantic negotiator 522 may repeatedly calculate scores of the plurality of items of the user preference, and may calculate the sum of the calculated scores. The semantic negotiator 522 may determine an optimized service based on the calculated scores. For example, a service that has the highest score may be determined to be the optimized service.

The semantic negotiator 522 may initialize the score of the service searched by the constraint matching. For example, semantic negotiator 522 may increase the score of an item that has a service preference property that matches the value of the user preference, from among the plurality of the items of the user preference. The semantic negotiator 522 may decrease the score of an item that does not have a service preference property that matches the value of the user preference. The semantic negotiator 522 may maintain the scores of all items if no item has a service preference property that matches the value of the user preference.

Figure 6:
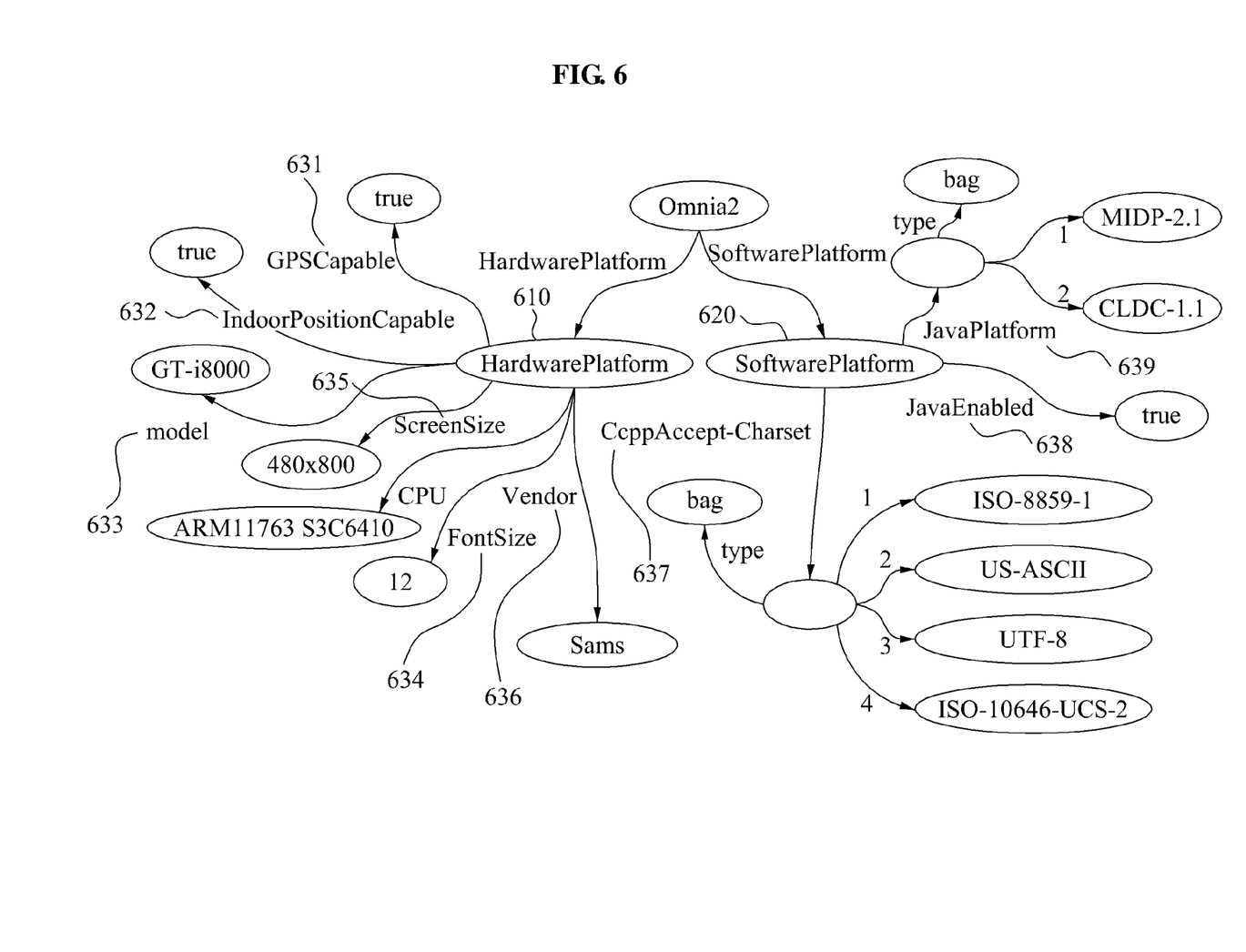
FIG. 6 is a diagram illustrating an example of a terminal ontology.

FIG. 6 illustrates an example of a terminal ontology.

Referring to the terminal ontology of FIG. 6, a mobile terminal includes a hardware platform 610 and a software platform 620. The terminal ontology may include a plurality of terminal properties.

In this example, a GPScapable property 631 indicates whether a Global Positioning System (GPS) function of the hardware platform 610 is supported. Also, an IndoorPositionCapable property 632 indicates whether an indoor position function of the hardware platform 610 is supported.

A Model property 633 indicates a model number of the mobile terminal. A Vendor property 636 indicates a manufacturer of the mobile terminal.

A FontSize property 634 indicates a font size used in the mobile terminal A ScreenSize property 635 indicates a screen size of the mobile terminal.

A CcppAccept-Charset property 637 indicates information about character codes that are supported by the software platform 620.

A JavaEnabled property 638 indicates whether the software platform supports Java. A JavaPlatform property 639 indicates a type of a Java platform that the software platform 620 supports.

Figure 7:
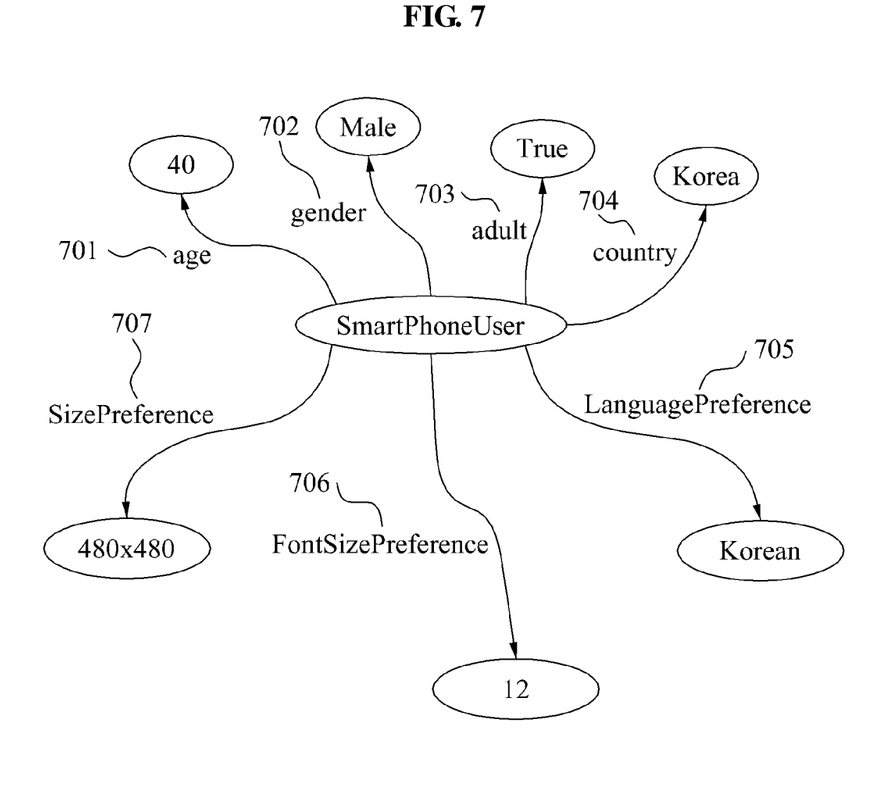
FIG. 7 is a diagram illustrating an example of a user ontology.

FIG. 7 illustrates an example of a user ontology.

Referring to FIG. 7, the user ontology includes a plurality of user properties.

An age property 701 indicates an age of a user, a gender property 702 indicates a gender of the user, an adult property 703 indicates whether the user corresponds to an adult, and a country property 704 indicates a country of the user.

Also, a LanguagePreference property 705 indicates a user preference with respect to a language that the user may use, a FontSizePreference property 706 indicates the user preference with respect to a font size, and a SizePreference property 707 indicates the user preference with respect to a screen size.

Figure 8:
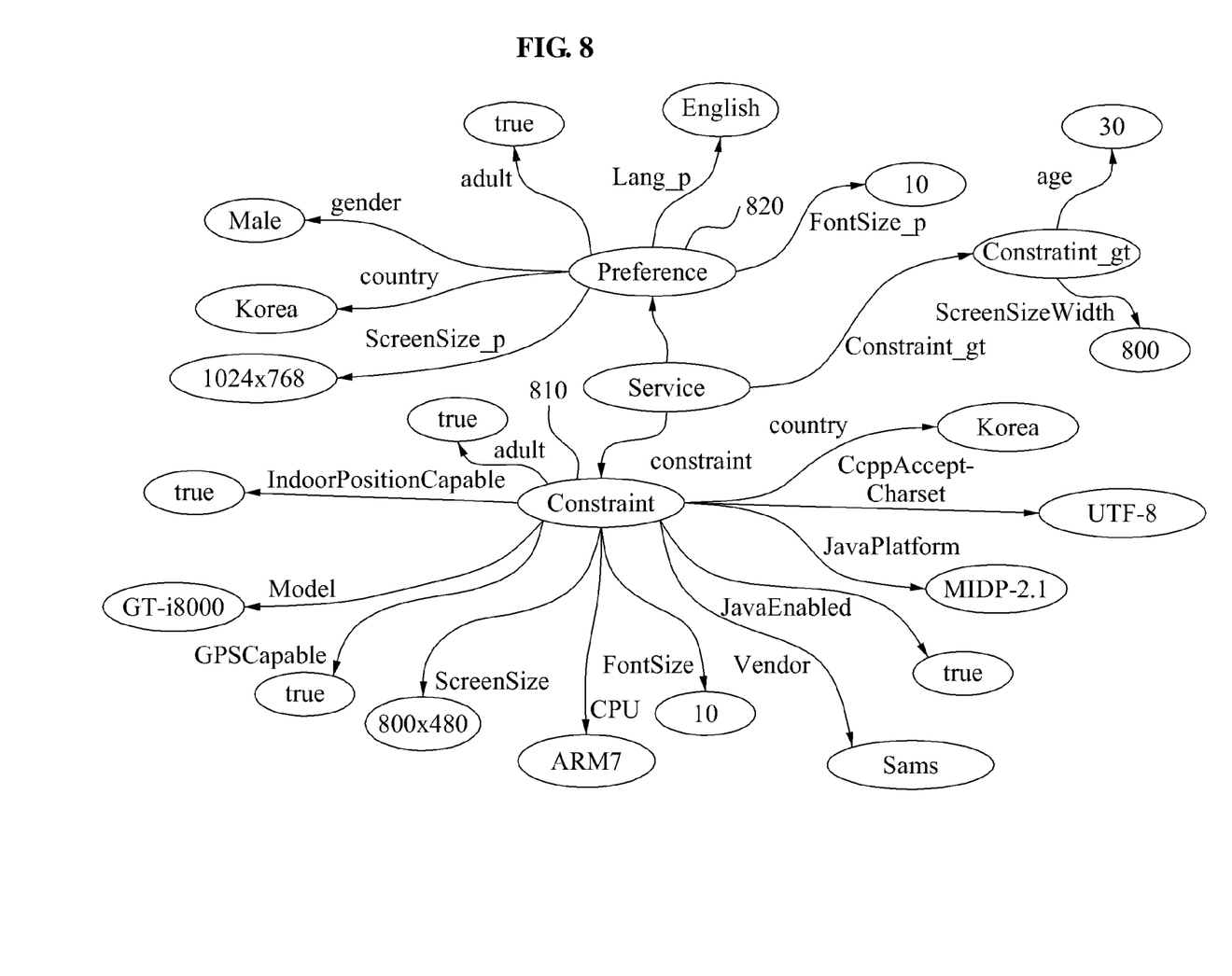
FIG. 8 is a diagram illustrating an example of a service ontology.

FIG. 8 illustrates an example of a service ontology.

Referring to the service ontology of FIG. 8, a mobile service includes a constraint 810 and a preference 820. The service ontology includes a plurality of constraint properties and a plurality of preference properties.

Figure 9:
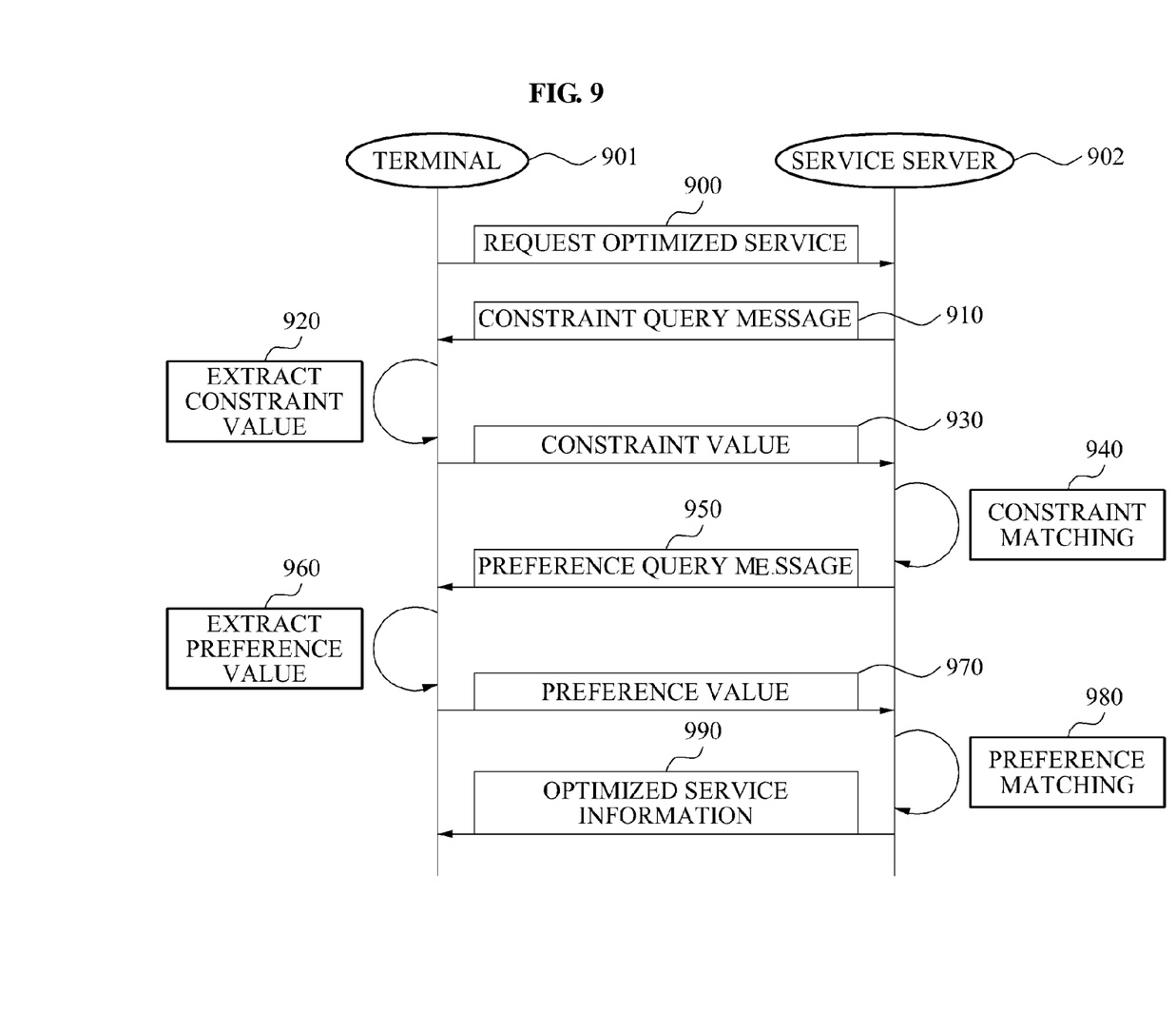
FIG. 9 is a flowchart illustrating an example of a semantic negotiation method.

FIG. 9 illustrates an example of a semantic negotiation method.

Referring to FIG. 9, the semantic negotiation method has a two-tier configuration when a semantic negotiation is performed between a terminal 901 and a service server 902.

In the semantic negotiation method, the terminal 901 transmits a service request message for requesting an optimized service to the service server, in 900. The service server 902 receives the service request message from the terminal 901. Also, the service server 902 transmits a constraint query message with respect to a constraint for performing the optimized service, to the terminal 901, in 910.

For example, the service server 902 may extract the constraint for performing a service from a service ontology by loading the service ontology to a memory, and may transmit, to the terminal 901, the constraint query message with respect to the extracted constraint.

For example, the constraint may include at least one of a constraint of the terminal 901 and a constraint of a user. For example, if a screen size greater than 800×480 is required to perform a predetermined service, the screen size greater than 800×480' may be a constraint for performing an optimized service. The constraints for performing a service may be described in the service ontology.

The service server 902 may perform an authentication procedure to verify an identification of the terminal 901 before transmitting the constraint query message to the terminal 901. In response to the identification of the terminal 901 being verified, the service server 901 may transmit the constraint query message to the terminal 901.

The terminal 901 receives the constraint query message with respect to the constraint for performing the optimized service, from the service server 902. For example, the terminal 901 may transmit and receive messages using ACL stated in FIPA standards.

The terminal 901 may perform a semantic negotiation based on an ontology between the terminal 901 and the service server 902. For example, the terminal 901 may convert semantic contents that are included in a message received from the service server 902, into a form of a SPARQL query. The terminal 901 may process the SPARQL query using a domain ontology and an inference engine. The terminal 901 may perform query processing of information corresponding to at least one of a property of a mobile terminal and a user preference. The terminal 901 may generate semantic contents using an inference result. The terminal 901 may perform a semantic negotiation by interworking with a semantic web framework such as Jena.

The terminal 901 extracts a value of the constraint for performing the optimized service, based on at least one of a user ontology or a terminal ontology, in 920.

The terminal 901 transmits the value of the extracted constraint to the service server 902, in 930. For example, the terminal 901 may transmit the value of the extracted constraint by determining the value of the extracted constraint in a form of RDF.

In this example, the service server 902 receives the value of the constraint from the terminal 901. The service server 902 performs constraint matching, in 940. For example, the service server 902 may perform constraint matching to search for a service that satisfies the constraint from among a plurality of services, based on the value of the constraint and the service ontology. The service server 902 may determine an optimized service through the services searched using constraint matching.

For example, the service server 902 may compare a plurality of items of the constraint, and the value of the constraint, and may search whether there is a service that satisfies all of the plurality of the items. The service server 902 may compare the plurality of the items of the constraint for performing the service, and a constraint value of the terminal 901 and/or the user. For example, the service server 902 may search whether there is the constraint value of the terminal 901 or of the user that satisfies the constraint, by performing a comparison operation.

For example, if a constraint of a 'screen size' item, from among a plurality of items of the constraint for performing a service, corresponds to 'a screen size greater than 800×480', the service server 902 may determine whether the service capable of being performed in the terminal 901, by searching for a value of the screen size of the terminal 901. If the screen size of the terminal 901 is greater than 800×480, the service may be capable of being performed, however, if the screen size of the terminal 901 is less than 800×480, the service may not be performed.

If there is a service that satisfies all of the plurality of the items, the service server 902 may determine the service to be the optimized service. That is, a service that fails to satisfy any one of the plurality of the items may be determined not to be the optimized service. The service server 902 may transmit information with respect to the optimized service to the terminal 901. The terminal 901 may receive the information with respect to the optimized service.

According to various examples, the semantic negotiation method may perform a semantic negotiation based on a user preference. The semantic negotiation method may further perform the semantic negotiation based on the user preference in order to search for a service corresponding to the user preference using constraint matching.

In the semantic negotiation method, the service server 902 transmits a preference query message with respect to the user preference to the terminal 901, in 950. For example, the service server 902 may extract the user preference from the service ontology by loading the service ontology to a memory, and may transmit the preference query message with respect to the extracted user preference to the terminal 901.

The terminal 901 receives the preference query message from the service server 902. The terminal 901 extracts a value of the user preference, based on at least one of the user ontology and the terminal ontology, in 960.

The terminal 901 transmits the value of the user preference to the service server 902, in 970. For example, the terminal 901 may transmit the value of the user preference by determining the value of the user preference in a form of RDF.

The service server 902 receives, from the terminal 901, the value of the user preference. The service server 902 performs preference matching, based on the value of the user preference, in 980. In 990, the service server 902 determines an optimized service and transmits information corresponding to the optimized service to the terminal 901.

For example, the service server 902 may calculate a score with respect to the service searched by the constraint matching, based on the value of the user preference. The service server 902 may calculate the score with respect to the service searched by the constraint matching for each of a plurality of items with respect to the user preference.

The service server 902 may repeatedly calculate scores of the plurality of items with respect to the user preference, and may calculate the sum of the calculated scores. The service server 902 may determine an optimized service based on the calculated scores. For example, a service that has the highest score may be determined to be the optimized service.

The service server 902 may initialize the score with respect to the service searched by the constraint matching. The service server 902 may increase the score of an item in which a service preference property has the same value as the value of the user preference. The service server 902 may decrease the score of an item that does not have a service preference property that has the same value as the value of the user preference. As another example, the service server 902 may maintain the score if no item has a service preference property that has the same value as the value of the user preference.

As described in the various examples herein, the terminal may include a storage for storing various data, for example, the user ontology and the terminal ontology. The server may include a storage for storing data as well, for example, for storing the service ontology.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A semantic negotiation module of a terminal that is designed by a first service provider, the semantic negotiation module comprising:
   a processor;
   a communication manager configured to transmit, to a service server designed by a second service provider, a service request message requesting an optimized service, and configured to receive, from the service server, a constraint query message with respect to a constraint for performing the optimized service; and
   a semantic negotiator configured to extract a value of the constraint, based on at least one of user ontology and terminal ontology,
   wherein the communication manager transmits, to the service server, the value of the extracted constraint, and receives, from the service server, information about the optimized service, and
   the at least one of the user ontology and the terminal ontology enables the terminal and the service server to interact even when the first service provider is different from the second service provider.

2. The semantic negotiation module of claim 1, wherein:
   the communication manager receives, from the service server, a preference query message with respect to a user preference, the semantic negotiator extracts a value of the user preference, based on the at least one of the user ontology and the terminal ontology, and the communication manager transmits, to the service server, the extracted value of the user preference, and receives, from the service server, information with respect to the optimized service to which the value of the user preference is applied.

3. A semantic negotiation module of a service server that is designed by a first service provider, the semantic negotiation module comprising:

a processor;

a communication manager configured to receive, from a terminal that is designed by a second service provider, a service request message requesting an optimized service, configured to transmit, to the terminal, a constraint query message with respect to a constraint for performing the optimized service, and configured to receive, from the terminal, a value of the constraint;

a semantic negotiator configured to perform constraint matching to search for a service that satisfies the constraint, from among a plurality of services, based on the value of the constraint and a service ontology, and configured to determine a service to be the optimized service based on the constraint matching, wherein the communication manager transmits, to the terminal, information with respect to the optimized service, and the service ontology enables the service server and the terminal to interact even when the first service provider is different from the second service provider.

4. The semantic negotiation module of claim 3, wherein:

the communication manager transmits, to the terminal, a preference query message with respect to a user preference, and receives, from the terminal, a value of the user preference, and the semantic negotiator calculates a score with respect to the service searched by the constraint matching, based on the value of the user preference, and determines the optimized service based on the calculated score.

5. The semantic negotiation module of claim 4, wherein:

the semantic negotiator initializes the score of the service searched by the constraint matching, the semantic negotiator increases the score of an item that has a service preference property that matches the value of the user preference, from among a plurality of items with respect the user preference, and the semantic negotiator decreases the score of an item that has a service preference property that does not match the value of the user preference.

6. The semantic negotiation module of claim 3, wherein the semantic negotiator compares a plurality of items of the constraint, searches for a service that satisfies all of the plurality of items, and determines a service that satisfies all of the plurality of items to be the optimized service.

7. A semantic negotiation method of a terminal that is designed by a first service provider, the method comprising:

transmitting, to a service server that is designed by a second service provider, a service request message requesting an optimized service;

receiving, from the service server, a constraint query message with respect to a constraint for performing the optimized service;

extracting a value of the constraint, based on at least one of user ontology and terminal ontology, wherein the at least one of the user ontology and the terminal ontology enables the terminal and the service server to interact even when the first service provider is different from the second service provider;

transmitting, to the service server, the value of the extracted constraint; and receiving, from the service server, information with respect to the optimized service.

8. The semantic negotiation method of claim 7, further comprising:

receiving, from the service server, a preference query message with respect to a user preference;

extracting a value of the user preference, based on the at least one of the user ontology and the terminal ontology;

transmitting, to the service server, the extracted value of the user preference; and receiving, from the service server, information with respect to the optimized service to which the value of the user preference is applied.

9. A semantic negotiation method of a service server that is designed by a first service provider, the method comprising:

receiving, from a terminal that is designed by a second service provider, a service request message requesting an optimized service;

transmitting, to the terminal, a constraint query message with respect to a constraint for performing the optimized service;

receiving, from the terminal, a value of the constraint;

performing constraint matching to search for a service that satisfies the constraint, from among a plurality of services, based on the value of the constraint and a service ontology, wherein the service ontology enables the service server and the terminal to interact even when the first service provider is different from the second service provider;

determining a service to be the optimized service based on the constraint matching; and transmitting, to the terminal, information with respect to the optimized service.

10. The semantic negotiation method of claim 9, further comprising:

transmitting, to the terminal, a preference query message with respect to a user preference;

receiving, from the terminal, a value of the user preference;

calculating a score with respect to the service searched by the constraint matching, based on the value of the user preference; and determining the optimized service based on the calculated score.

11. A non-transitory computer-readable storage medium having stored therein program instructions to cause a processor to implement a semantic negotiation method of a terminal that is designed by a first service provider, the semantic negotiation method comprising:

transmitting, to a service server designed by a second service provider, a service request message requesting an optimized service;

receiving, from the service server, a constraint query message with respect to a constraint for performing the optimized service;

extracting a value of the constraint, based on at least one of a user ontology and a terminal ontology, wherein the at least one of the user ontology and the terminal ontology enables the terminal and the service server to interact even when the first service provider is different from tile second service provider;

transmitting, to the service server, the value of the extracted constraint; and receiving, from the service server, information with respect to the optimized service.

12. A terminal designed by a first service provider and configured to be loosely coupled to a server designed by a second service provider to perform semantic negotiation based on an ontology, the terminal comprising:
- a processor;
- a communication manager configured to receive a constraint query message identifying a constraint of a service of the server; and
- a semantic negotiator configured to extract the constraint from at least one ontology corresponding to a user of the terminal and/or the terminal,
- wherein the communication manager is further configured to transmit the extracted constraint to the server, and
- the at least one ontology corresponding to the user of the terminal and/or the terminal enables the terminal and the server to interact even when the first service provider is different from the second service provider.

13. The terminal of claim 12, wherein the semantic negotiator is configured to convert semantic contents included in the constraint query message into the form of a SPARQL query, and configured to process the SPARQL query based on the at least one ontology and an inference engine, to extract the constraint.

14. The terminal of claim 12, wherein, prior to receiving the constraint query message from the server, the communication manager is further configured to transmit a request requesting an optimized service to the server.

15. The terminal of claim 12, wherein the communication manager is further configured to receive a preference query message from the server which requests a preference of the user based on a service ontology, the semantic negotiator extracts the user preference based on the at least one ontology, and the communication manager transmits the extracted user preference to the server.

16. The terminal of claim 15, wherein the communication manager is further configured to receive information about an optimized service from the server, and the optimized service is determined by the server based constraint matching of the extracted user preference of the terminal.

17. The terminal of claim 15, wherein, in response to receiving the preference query from the server, the semantic negotiator is further configured to extract a plurality of items corresponding to the constraint based on the at least one ontology, and the communication manager is further configured to transmit the plurality of items corresponding to the constraint to the server.

18. The terminal of claim 12, wherein the at least one ontology comprises a terminal ontology that includes a hardware platform identifying hardware values of the terminal and a software platform identifying software values of the terminal, and a user ontology that includes user preferences of the user of the terminal.

19. The terminal of claim 12, wherein communication manager is further configured to transmit and receive messages for semantic negotiation with the server using an agent communication language (ACL) as stated in the Foundation for Intelligent Physical Agents (FIPA) standards.

* * * * *